US008249457B2

(12) United States Patent
Ruch et al.

(10) Patent No.: US 8,249,457 B2
(45) Date of Patent: Aug. 21, 2012

(54) METHOD AND DEVICE FOR BIDIRECTIONAL IR DATA TRANSFER BETWEEN A MEDICAL TREATMENT TABLE AND AN OPERATOR CONTROL DEVICE

(75) Inventors: Jürgen Ruch, Offenburg (DE); Thomas Biehl, Rastatt (DE)

(73) Assignee: Maquet GmbH & Co. KG, Rastatt (DE)

( * ) Notice: Subject to any disclaimer, the term of this patent is extended or adjusted under 35 U.S.C. 154(b) by 992 days.

(21) Appl. No.: 11/598,440

(22) Filed: Nov. 13, 2006

(65) Prior Publication Data

US 2007/0110448 A1 May 17, 2007

(30) Foreign Application Priority Data

Nov. 14, 2005 (DE) ........................ 10 2005 054 230

(51) Int. Cl.
*H04J 14/08* (2006.01)
*H04B 10/00* (2006.01)

(52) U.S. Cl. .......... 398/99; 398/100; 398/103; 398/107; 398/127

(58) Field of Classification Search .............. 5/600–624; 398/99, 103, 106, 107, 109, 112, 118, 127, 398/128, 130, 98, 100, 102
See application file for complete search history.

(56) References Cited

U.S. PATENT DOCUMENTS 566,521 A 8/1896 Leger
1,740,906 A 12/1929 Rothauszky et al.
2,416,410 A 2/1943 Shampaine
2,763,320 A 9/1956 Schram
2,764,459 A 9/1956 McDonald
2,771,330 A 11/1956 Zaalberg
2,775,496 A 12/1956 Berggren
2,816,806 A 12/1957 Zaalberg
2,995,762 A 8/1961 Albinson
3,226,734 A 1/1966 Coventon
3,238,539 A 3/1966 Koch
3,302,218 A 2/1967 Stryker
(Continued)

FOREIGN PATENT DOCUMENTS

DE 264297 8/1912
(Continued)

OTHER PUBLICATIONS

V. Vitsas, et al., Performance Analysis of the Advanced Infrared (AIr) CSMA/CA MAC Protocol for Wireless LANs, 2003, Kluwer Academic Publishers, Wireless Networks 9, pp. 495-507.*

(Continued)

*Primary Examiner* — Danny Leung
*Assistant Examiner* — Daniel Dobson
(74) *Attorney, Agent, or Firm* — McCormick, Paulding & Huber LLP

(57) ABSTRACT

The invention presents a method and a device for bidirectional IR data transfer between a medical treatment table, particularly an operating table (10*a* to 10*d*), and an operator control device (12*a* to 12*d*) which are subscribers in the IR data transfer and which each comprise an IR transmitter and an IR receiver, where the data to be transferred by a subscriber (10*a* to 10*d*, 12*a* to 12*d*) are split into data blocks which are transmitted in succession, with a respective break being observed between the transmission of the individual data blocks, and where data from another subscriber are transmitted within the breaks.

12 Claims, 2 Drawing Sheets

U.S. PATENT DOCUMENTS

| | | | | |
|---|---|---|---|---|
| 3,328,079 | A | 6/1967 | Byczkowski et al. | |
| 3,362,704 | A | 1/1968 | Pilz | |
| 3,379,877 | A | 4/1968 | Makino et al. | |
| 3,388,700 | A | 6/1968 | Mountz | |
| 3,868,103 | A | 2/1975 | Pageot et al. | |
| 4,101,120 | A | 7/1978 | Seshima | |
| 4,176,415 | A | 12/1979 | Dickerson et al. | |
| 4,244,358 | A | 1/1981 | Pyers | |
| 4,597,119 | A | 7/1986 | Padgett | |
| 4,640,482 | A | 2/1987 | Rogers | |
| 4,768,241 | A | 9/1988 | Beney | |
| 5,031,547 | A | 7/1991 | Hirose | |
| 5,083,331 | A | 1/1992 | Schnelle et al. | |
| 5,220,698 | A | 6/1993 | Hannant | |
| 5,277,427 | A | 1/1994 | Bryan et al. | |
| 5,279,011 | A | 1/1994 | Schnelle | |
| 5,477,570 | A | 12/1995 | Hannant et al. | |
| 5,544,376 | A | 8/1996 | Fromson | |
| 5,564,852 | A | 10/1996 | Maxwell et al. | |
| 5,611,638 | A | 3/1997 | Dorr et al. | |
| 5,615,431 | A | 4/1997 | Vassilli | |
| 5,621,932 | A | 4/1997 | Strachan | |
| 5,628,078 | A | 5/1997 | Pennington et al. | |
| 5,649,833 | A | 7/1997 | Pfeuffer et al. | |
| 5,651,150 | A | 7/1997 | Kanitzer et al. | |
| 5,659,909 | A | 8/1997 | Pfeuffer et al. | |
| 5,754,997 | A | 5/1998 | Lussi et al. | |
| 5,769,720 | A | 6/1998 | Aiken et al. | |
| 5,787,528 | A | 8/1998 | Antinori | |
| 5,790,996 | A | 8/1998 | Narfstrom | |
| 5,914,796 | A * | 6/1999 | Selin | 398/118 |
| 5,969,488 | A | 10/1999 | Fromson | |
| 6,008,598 | A | 12/1999 | Luff et al. | |
| 6,038,718 | A | 3/2000 | Pennington et al. | |
| 6,073,284 | A | 6/2000 | Borders | |
| 6,095,713 | A | 8/2000 | Doyle et al. | |
| 6,130,894 | A * | 10/2000 | Ojard et al. | 370/421 |
| 6,351,678 | B1 | 2/2002 | Borders | |
| 6,390,927 | B1 | 5/2002 | Cleveland, III | |
| 6,396,224 | B1 | 5/2002 | Luff et al. | |
| 6,484,334 | B1 | 11/2002 | Borders et al. | |
| 6,538,990 | B1 * | 3/2003 | Prorock | 370/229 |
| 6,539,028 | B1 * | 3/2003 | Soh et al. | 370/445 |
| 6,560,492 | B2 | 5/2003 | Borders | |
| 6,565,156 | B1 | 5/2003 | Yamashita et al. | |
| 6,609,260 | B2 | 8/2003 | Hand et al. | |
| 6,619,872 | B2 | 9/2003 | Crorey et al. | |
| 6,634,202 | B1 | 10/2003 | Oetiker | |
| 6,722,289 | B2 | 4/2004 | Kato | |
| 6,862,761 | B2 | 3/2005 | Hand et al. | |
| 6,971,131 | B2 | 12/2005 | Bannister | |
| 6,986,179 | B2 | 1/2006 | Varadharajulu | |
| 7,010,369 | B2 | 3/2006 | Borders et al. | |
| 7,068,143 | B2 | 6/2006 | Doering et al. | |
| 7,089,612 | B2 | 8/2006 | Rocher et al. | |
| 7,154,397 | B2 * | 12/2006 | Zerhusen et al. | 340/573.1 |
| 7,181,791 | B2 | 2/2007 | Clayton | |
| 7,210,201 | B2 | 5/2007 | Maeckle et al. | |
| 7,235,942 | B2 | 6/2007 | Nagaoka et al. | |
| 7,321,811 | B1 | 1/2008 | Rawls-Meehan | |
| 7,346,944 | B2 | 3/2008 | Shaw | |
| 7,367,740 | B2 | 5/2008 | Lazic et al. | |
| 7,398,790 | B2 | 7/2008 | Glatz | |
| 7,412,736 | B2 | 8/2008 | Hyre et al. | |
| 7,526,823 | B2 | 5/2009 | Koch | |
| 7,634,826 | B2 | 12/2009 | Koch | |
| 7,669,258 | B2 | 3/2010 | Koch | |
| 7,694,366 | B2 | 4/2010 | Koch et al. | |
| 2002/0014951 | A1 * | 2/2002 | Kramer et al. | 340/5.8 |
| 2002/0111701 | A1 | 8/2002 | Borders | |
| 2002/0170115 | A1 | 11/2002 | Borders et al. | |
| 2003/0078144 | A1 | 4/2003 | Gehrke | |
| 2003/0090387 | A1 * | 5/2003 | Lestienne et al. | 340/825.49 |
| 2003/0195644 | A1 | 10/2003 | Borders et al. | |
| 2004/0006821 | A1 | 1/2004 | Hand et al. | |
| 2004/0074003 | A1 | 4/2004 | Bannister | |
| 2004/0172757 | A1 | 9/2004 | Somasundaram | |
| 2005/0025176 | A1 * | 2/2005 | Ko et al. | 370/448 |
| 2006/0274747 | A1 * | 12/2006 | Duchscher et al. | 370/389 |
| 2007/0056105 | A1 | 3/2007 | Hyre et al. | |
| 2007/0101497 | A1 | 5/2007 | Revenus | |
| 2007/0101500 | A1 | 5/2007 | Fruh et al. | |
| 2007/0107123 | A1 | 5/2007 | Koch | |
| 2007/0107124 | A1 | 5/2007 | Koch | |
| 2007/0107125 | A1 | 5/2007 | Koch | |
| 2007/0107126 | A1 | 5/2007 | Koch | |
| 2007/0107129 | A1 | 5/2007 | Burstner | |
| 2007/0110448 | A1 | 5/2007 | Ruch et al. | |
| 2007/0116512 | A1 | 5/2007 | Katzenstein | |
| 2007/0118989 | A1 | 5/2007 | Koch | |
| 2009/0119842 | A1 | 5/2009 | Koch | |
| 2010/0107340 | A1 | 5/2010 | Koch et al. | |

FOREIGN PATENT DOCUMENTS

| | | | |
|---|---|---|---|
| DE | 4229318 | C1 | 9/1993 |
| DE | 296 10 726 | U1 | 9/1996 |
| DE | 19732467 | A1 | 2/1999 |
| DE | 197 51 320 | A1 | 5/1999 |
| DE | 19748367 | A1 | 5/1999 |
| DE | 19751329 | A1 | 5/1999 |
| DE | 19919496 | A1 | 11/2000 |
| DE | 102 53 878 | A1 | 5/2004 |
| DE | 102 53 906 | A1 | 6/2004 |
| EP | 0 457 246 | A1 | 11/1991 |
| EP | 0625348 | A1 | 11/1994 |
| EP | 0832603 | A1 | 4/1998 |
| EP | 0 913 139 | | 5/1999 |
| FR | 2388546 | | 11/1978 |
| GB | 1 321 193 | | 6/1973 |
| GB | 2260075 | A | 4/1993 |
| GB | 2 277 870 | A | 11/1994 |
| WO | 99 28146 | A1 | 6/1999 |
| WO | 02 055001 | A1 | 7/2002 |
| WO | 03 086263 | A1 | 10/2003 |

OTHER PUBLICATIONS

European Search Report for Serial No. EP 06 12 3443 dated Feb. 7, 2007.

European Search Report for Serial No. EP 06 12 3596 dated Sep. 7, 2007.

European Search Report for Serial No. EP 06 12 3592 dated Nov. 29, 2007.

European Search Report for Serial No. EP 06 12 3593 dated Dec. 4, 2007.

European Search Report for Application No. EP 06 12 3721, dated Jun. 20, 2008.

European Search Report for Serial No. EP 06 12 3598 dated Feb. 8, 2007.

European Search Report for Application No. EP 06 12 3444, dated Aug. 22, 2008.

European Search Report for Application No. EP 06 12 3719, dated Sep. 7, 2007.

* cited by examiner

METHOD AND DEVICE FOR BIDIRECTIONAL IR DATA TRANSFER BETWEEN A MEDICAL TREATMENT TABLE AND AN OPERATOR CONTROL DEVICE

CROSS REFERENCE TO RELATED APPLICATIONS

Applicant hereby claims foreign priority benefits under U.S.C. §119 from German Patent Application No. 10 2005 054 230.1 filed on Nov. 14, 2005, the contents of which are incorporated by reference herein.

FIELD OF THE INVENTION

The present invention relates to a method for bidirectional IR data transfer between a medical treatment table, particularly an operating table, and an operator control device which each comprise an IR transmitter and an IR receiver. The operating table and the operator control device are subsequently also referred to as "subscribers" in the IR data transfer for short. Within the context of this application, a medical treatment table is understood to mean any kind of patient bearing surface which can bear a patient for examination or treatment, i.e. including a couch or a bed-transfer device, for example.

BACKGROUND OF THE INVENTION

The typical case of an IR data transfer for an operating table is effected unilaterally, namely from an operator control device to the operating table. In this case, adjustment commands for adjusting or moving the operating table are transferred to the operating table wirelessly as IR signals.

It is also known practice to transfer data by means of IR signals between an operating table and a "mural tableau" which is a special case of an operator control device. The mural tableau has keys for inputting adjustment commands which are transferred to the operating table as IR signals. The operating table can for its part use an IR transmitter to transmit status information as IR signals to the mural tableau, which then shows the information on an LC display.

In the case of this known method, data are accordingly transferred bidirectionally as IR signals between the operating table and the operator control device. However, the signals can be transferred in the reciprocal directions only in succession. If a key on the mural tableau is pressed, for example, in order to move the operating table to a particular position then an acknowledgement from the operating table cannot be transmitted until the key is released. This means that an acknowledgement from the operating table cannot be returned while the mural tableau is being operated, for example an acknowledgement about whether or not a particular desired attitude has already been reached. Continuous user guidance in which the current state of the operating table is displayed on the operator control device is therefore not possible.

SUMMARY OF THE INVENTION

The invention is based on the object of specifying a method and an apparatus of the type mentioned at the outset which allow continuous user guidance.

This object is achieved for the method of the type mentioned at the outset by virtue of the data to be transferred by a subscriber being split into data blocks which are transmitted in succession, with a respective break being observed between the transmission of the individual data blocks, and where data from another subscriber are transmitted within the breaks. This object is also achieved by a device according to Claim 15. Advantageous developments are specified in the dependent claims.

On the basis of the inventive method, the two subscribers can transmit more or less simultaneously, or a plurality of appliances can be operated simultaneously without there being a risk of a data collision, since one subscriber can transfer its data blocks in the respective break between two data blocks from the other subscriber. If the user of the operator control device thus holds down a key, for example, in order to adjust a section of the operating table, this command is transferred in the form of data blocks between which there is a respective break. In these breaks, the operating table can then for its part return status information, for example the attitude in which the adjusted section is currently situated. This status information then helps the user to find a particular attitude, for example a 45° attitude for a bearing surface segment. This more or less simultaneous communication between the operating table and the operator control device therefore allows continuous user guidance. In addition, the interference immunity for the data transfer between the subscribers is increased.

Preferably, the transmission of a data block is preceded by a check to determine whether IR signals are currently present, and if IR signals are present then the transmission of the data block is held until a predetermined waiting time has elapsed since the disappearance of the IR signal. In this way, the two subscribers in the IR data transfer synchronize themselves such that they transmit in the respective break between the data blocks from the respective other subscriber. However, this development also has the further advantage that it avoids collision between the transmitted data and interfering signals from extraneous transmitters which are likewise emitting IR signals. This is because this development involves transmission only when such an interfering signal has actually disappeared. Examples of possible sources of interfering signals which may occur in operating theatres are electronic ballasts for fluorescent lamps or other medical equipment, for example surgical navigation systems.

Preferably, the predetermined waiting time for the operator control device is different from, in particular shorter than, the predetermined waiting time for the operating table. The effect achieved by this is that, following the disappearance of an IR signal, both subscribers do not attempt to transmit simultaneously and in so doing interfere with one another. The shorter predetermined waiting time means that the operator control device is preferred in this case because operation has higher priority than status acknowledgment by the operating table.

In one advantageous development, a plurality of operating tables and associated operator control devices having at least partly overlapping IR signal reception ranges are provided, and each of the subscribers is allocated a different waiting time. If there are a plurality of operating tables in an operating theatre, or if adjacent operating theatres are connected by windows, it may be that the IR signal reception ranges overlap, which means that, by way of example, an operating table receives signals from another operating table or from the operator control device for another operating table. Although the operating table uses an identification code (described in more detail below) to identify whether or not the signal is intended for it, the signal from another operating table or its operator control device can disturb simultaneous reception of the signal from its own operating unit. To avoid these problems, each of the subscribers is allocated a different waiting time, which means that all subscribers whose IR signal reception ranges might overlap are synchronized to one another such that they cannot interfere with one another, as explained in more detail below with reference to an exemplary embodiment.

Alternatively, different waiting times may be provided and the relevant waiting time can be selected at random from the waiting times which are provided. In the case of this random selection of the waiting times, it is improbable that transmission takes place simultaneously for two different operating tables. The random selection of waiting times therefore offers a very simple alternative for avoiding signal collision without the need to tune the various operating tables' waiting times to one another especially.

In one particularly advantageous development, at least one of the subscribers receives its transmitted IR signal itself, checks it and, if the signal has been disturbed, retransmits the associated data. This allows a collision with other IR signals to be repaired retrospectively without losing data.

Preferably, the carrier frequency for the IR signals is more than 120 kHz, particularly preferably 350 to 550 kHz. This means that the carrier frequency is far above the previously used carrier frequencies of 40 kHz or less. This increased carrier frequency has two great advantages. First, the data blocks can be made shorter for the same contained volume of data at a higher carrier frequency. This reduces the probability of external interference coming in the transfer period for a data block. In addition, the data from a relatively large number of subscribers can be interleaved in one another without the data transfer for each individual subscriber becoming too slow.

The other advantage is that the sources of IR interfering fields which are typical for an operating theatre, particularly electronic ballasts for fluorescent lamps or infrared cameras in navigation systems, have lower carrier frequencies which are likewise in the region of 40 kHz or below. The choice of a much higher carrier frequency than this lessens the interaction with the interfering fields, which means that the influence of the interference can be significantly reduced.

Preferably, each data block contains an identification code which is associated with a subscriber, which means that each subscriber can identify from the identification code whether the data block is intended for it.

The signal length of a data block is preferably between 1 ms and 50 ms, particularly preferably 2 ms and 10 ms. This signal length is long enough to transmit a sufficient volume of data. At the same time, it is short enough to keep down the probability of interference and to interlace the transport of data to and fro so finely that for practical purposes it is possible to refer to "simultaneous" transfer which allows the continuous user guidance described above for the first time.

Preferably, the break between the transmission of two data blocks by a subscriber is 5 to 50 times, particularly 10 to 25 times, the signal length of a data block. With this ratio, it is a simple matter, in the method described above, in which different subscribers are allocated different waiting times, to synchronize the signal transfer by a relatively large number of subscribers, as explained in more detail below with reference to an exemplary embodiment.

The data to be transferred from the operator control device to the operating table can relate to adjustment commands for adjusting the bearing surface of the operating table.

The data transferred from the operating table to the operator control device can relate to status indicators for one or more of the following states of the operating table: the current attitude and position of the bearing surface, the arrival at stored attitudes and positions of the bearing surface, error messages, information about functions which are not possible, connection to the power supply, the charge state of storage batteries, and a warning about a collision between the operating table and further accessories.

BRIEF DESCRIPTION OF THE DRAWINGS

To improve understanding of the present invention, the text below refers to the preferred exemplary embodiment shown in the drawings which is described using specific terminology. However, it should be pointed out that the scope of protection of the invention is not intended to be restricted thereby, since such alterations and further modifications to the method shown and such further applications of the invention as are indicated therein are considered to be usual current and future specialist knowledge possessed by a competent person skilled in the art. The figures show an exemplary embodiment of the invention, namely.

DETAILED DESCRIPTION OF THE INVENTION

Figure 1A:
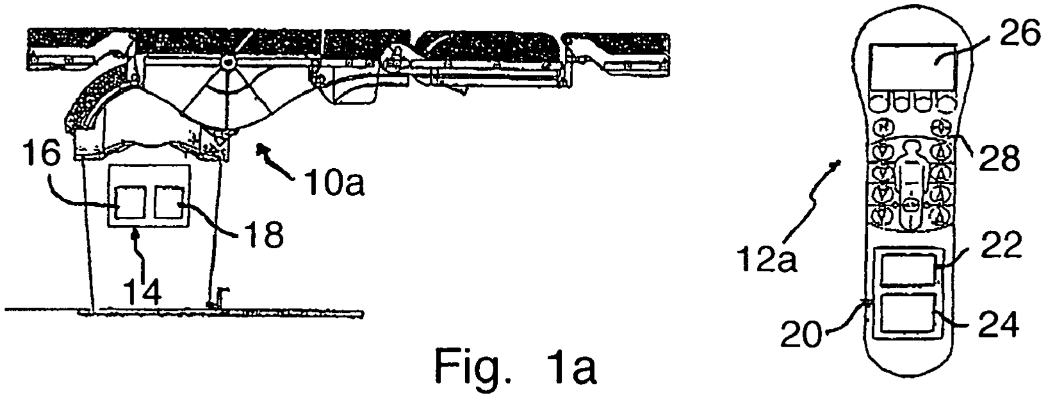
FIGS. 1*a*, 1*b*, 1*c* and 1*d* show four operating tables with associated operator control devices.
Figure 1B:
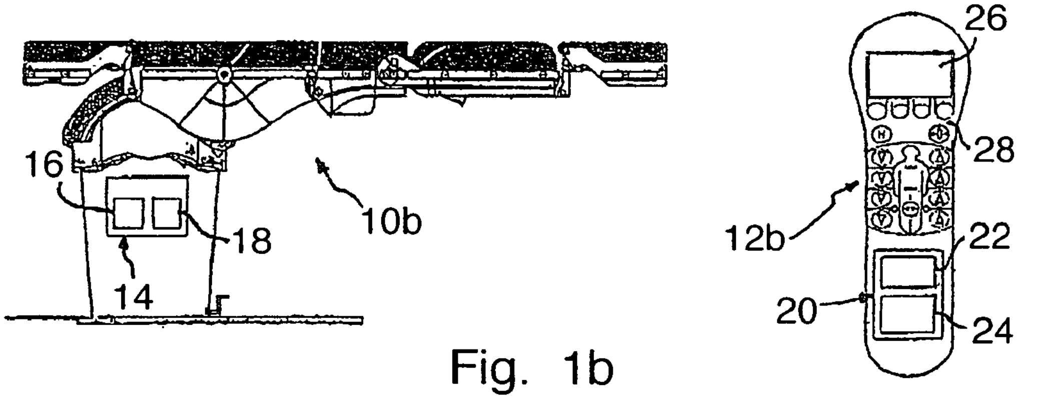
Figure 1C:
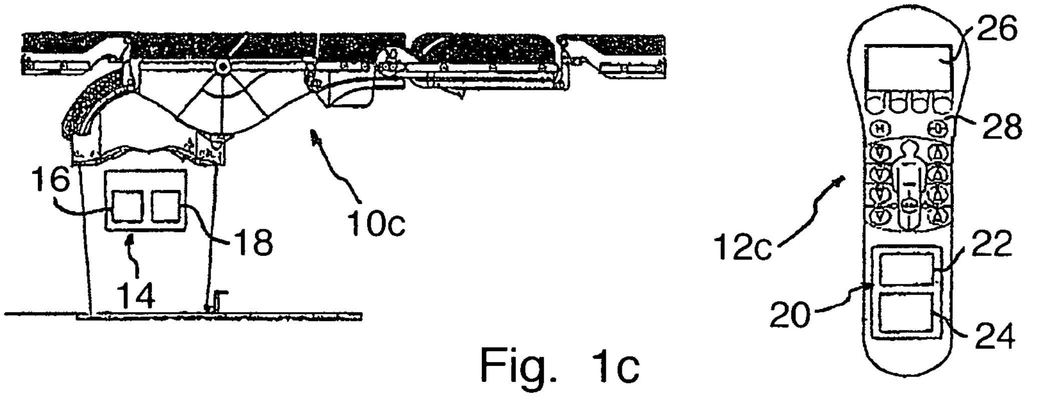
Figure 1D:
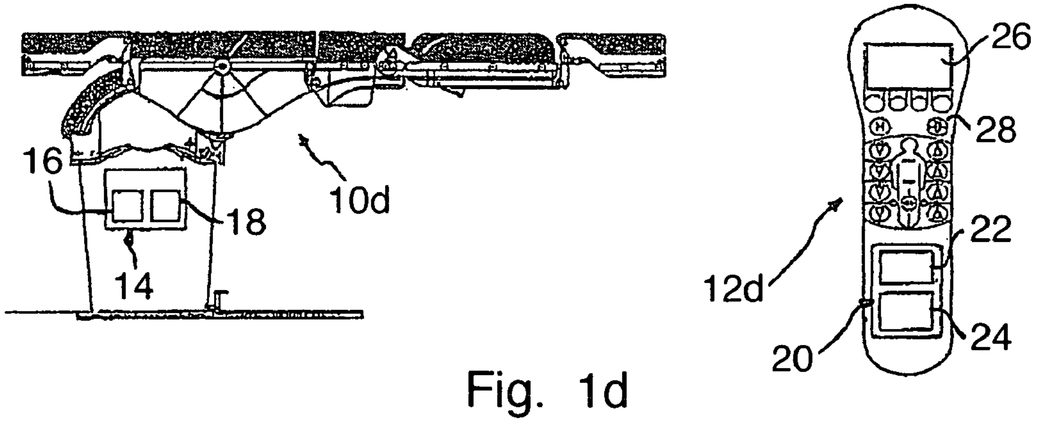

FIGS. 1*a*, 1*b*, 1*c*, 1*d* schematically show four operating tables 10*a* to 10*d* with their associated operator control devices 12*a* to 12*d*. Each operating table 10*a* to 10*d* comprises a schematically shown IR data transfer unit 14 which comprises an IR transmitter 16 and an IR receiver 18.

Each of the operator control devices 12*a* to 12*d* comprises a schematically shown IR data transfer unit 20 having a transmitter 22 and a receiver 24. The operator control devices 12*a* to 12*d* also have an LC display 26 and a control surface 28 on which buttons or keys for inputting adjustment commands are arranged.

The data transfer unit 14 in the operating table and the data transfer unit 20 in the operator control device interchange data in the form of IR signals. The two are therefore subsequently also referred to as "subscribers" in the IR data transfer in generalized form. The operating table 10*a* and the associated operator control device 12*a* have a shared IR code which is used to flag the data blocks which one of them transmits to the other. Using this IR code, the subscriber identifies the data which are intended for it. The other pairs comprising an operating table and an operator control device 10*b*/12*b*, 10*c*/12*c* and 10*d*/12*d* also have a respective unique IR code.

The operating tables 10*a* to 10*d* are situated in a shared operating theatre or in separate operating theatres which are connected by means of windows, so that signals from an operating table or its operator control can also be received by one or more of the other operating tables and/or their operator control devices. In other words, the IR signal reception ranges of the operating tables 10*a* to 10*d* overlap one another at least in part.

The text below explains the basic features of bidirectional IR data transfer between two subscribers on the basis of the operating table 10*a* and the associated operator control device 12*a*. Adjustment commands can be input on the operator control device 12*a* using the control panel 28. These adjustment commands are transmitted to the operating table 10*a* by the transmitter 22 as digital IR signals and are received by the operating table's receiver 18. A control unit (not shown) in the operating table 10*a* actuates suitable actuators (not shown) in order to adjust the operating table 10*a* on the basis of the adjustment commands.

By way of example, the user holds down a key for adjusting the height of the operating table 10*a* until said operating table has moved to the desired height. The data for adjusting the height are not transferred to the operating table 10*a* continuously, however, but rather in the form of data blocks which are transmitted in succession, with a respective break being observed between the transmission of the individual data blocks.

During the adjustment, a controller (not shown) in the operating table 10*a* produces information about the present state or status of the operating table 10*a*. This information is transmitted as digital IR signals to the operator control device 12*a* as digital status indicators in the breaks between the data blocks which the operator control device 12*a* transmits to the operating table 10*a*, and its content is displayed on the LC display 26. During the aforementioned height adjustment of the operating table, for example, the user can therefore read off the height currently reached on the LC display 26 and can stop the height adjustment or continue with it according to the value displayed. This more or less simultaneous, interleaved transfer of IR signals between the operating table 10*a* and the operator control device 12*a* means that the user is provided with the current status indicators during operator control of the operator control device 12*a* and can orient himself thereto, i.e. he is guided in the operator control.

During operation of the operating table 10*a*, a multiplicity of states of the operating table 10*a* are displayed on the display 26, including the current attitude and position of the bearing surface of the operating table 10*a*, information about whether a stored attitude or position of the bearing surface has already been reached, error messages, such as that a lock between the bearing surface and the table column is not closed, information about functions which are not possible, information regarding the power supply, or, in the case of a mobile operating table, the charge state of storage batteries, and a warning signal if there is the risk that the operating table might collide with an accessory.

Figure 2:
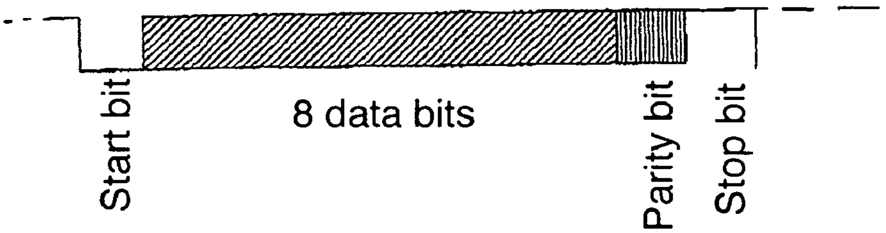
FIG. 2 shows a schematic illustration of the structure of a byte in the IR data format.

In the exemplary embodiment shown, the carrier frequency for the IR signals is 455 kHz. In this case, a bit has a length of 50 μs. FIG. 2 schematically shows the structure of a byte in the data format used. As FIG. 2 shows, a byte comprises a start bit followed by 8 data bits. These are followed by a parity bit and a stop bit. This results in a total byte length of 550 μs.

Figure 3:
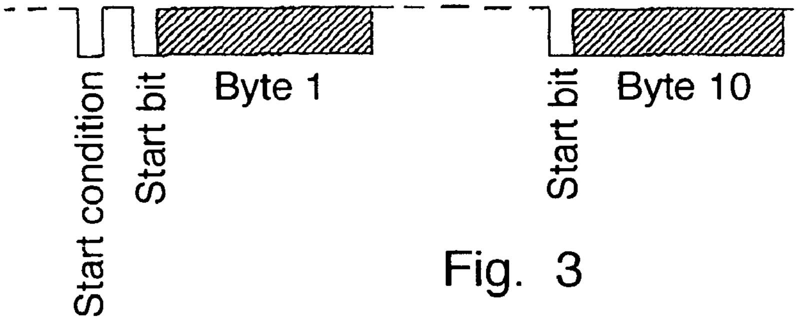
FIG. 3 shows a schematic illustration of the structure of a data block in the IR data format.

FIG. 3 schematically shows the structure of a data block. Each data block starts with a start condition comprising two bits, namely 50 μs "0" and 50 μs "1". This flags the start of a data block. The next two bytes are used to identify the transmitter of the data. These identification data contain the aforementioned IR code, inter alia. The third byte contains a checksum and the fourth to tenth bytes contain the useful data. The individual bytes in a data block are transmitted continuously. Including the start condition, this results in a duration of 5.6 ms for a data block.

Before a subscriber transmits a data block, it first of all checks whether another IR signal is currently present, whether because another transmitter is currently transmitting a message or because an extraneous device is transmitting an interfering signal. Only when this IR signal has disappeared is the subscriber permitted to transmit its data block, after an additional waiting time.

In the exemplary embodiment shown, the waiting time is different for each of the eight subscribers 10*a* to 10*d*, 12*a* to 12*d*. The reason for this is that otherwise two or more subscribers which, by chance, are simultaneously waiting for a currently transmitted message to end would transmit at the same time and their signals would interfere with one another. In the exemplary embodiment shown, this problem is solved such that the waiting time for the operator control device 12*a* is 1 ms, the waiting time for the operator control device 12*b* is 2 ms, the waiting time for the operator control device 12*c* is 3 ms and the waiting time for the operator control device 12*d* is 4 ms. The waiting time for the operating table 10*a* is 5 ms, the waiting time for the operating table 10*b* is 6 ms, the waiting time for the operating table 10*c* is 7 ms and the waiting time for the operating table 10*d* is 8 ms. The operator control devices 12*a* to 12*d* therefore all have shorter waiting times and are therefore preferred over the operating tables 10*a* to 10*d*. The idea behind this is that the operator control devices which output the active commands have a higher priority than the operating tables, which essentially return status information.

Figure 4:
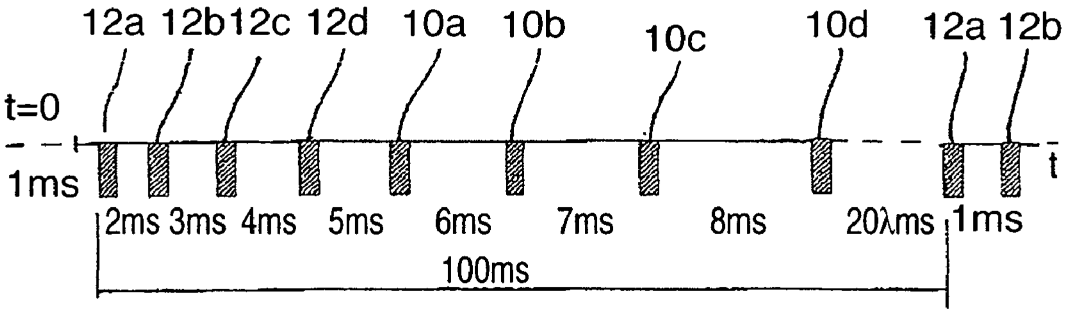
FIG. 4 shows a timing diagram which schematically illustrates the timing of the transmission by the operating tables and operator control devices shown in FIG. 1.

In the timing diagram shown in FIG. 4, the time t=0 denotes the instant at which a previously transmitted IR signal is at an end. After a waiting time of 1 ms, the operator control device 12*a* transits its data block, which lasts 5.6 ms (the length of the data blocks is not shown to scale in FIG. 4). After 2 ms, that is to say while the operator control device 12*a* is already transmitting its data block, the waiting time for the operator control device 12*b* of 2 ms has elapsed. The operator control device 12*b* checks whether an IR signal is present, which is the case because the operator control device 12*a* is currently transferring its data block, of course. Accordingly, the operator control device 12*b* waits until transfer of the data block from the operator control device 12*a* has ended and waits a further 2 ms until it starts to transfer its data block. 3 ms after the operator control device 12*b* has finished transmitting its data block, the operator control device 12*c* starts to transfer its data block etc. As a result of the different waiting times, the eight subscribers 10*a* to 10*d*, 12*a* to 12*d* synchronize themselves to one another, so that they can all successively transmit their data block.

After 80.8 ms, which is obtained from eight data block lengths of 5.6 ms plus the sum of the waiting times, the last subscriber, the operating table 10*d*, has also transmitted its data block. In the exemplary embodiment shown, each subscriber transmits a data block cyclically every 100 ms. 20.2 ms after the operating table 10*d* has transmitted its data block, or 101 ms after the instant t=0 in FIG. 1, the operator control device 12*a* therefore in turn transmits a further data block, and the sequence is repeated.

In this way, eight subscribers can transfer their data more or less simultaneously, namely interleaved in one another.

Alternatively, it would be possible for the subscribers 10*a* to 10*d*, 12*a* to 12*d* to select their waiting times on the basis of a random principle, for example for the operator control devices 12*a* to 12*d* to select at random from waiting times of 1, 2, 3 or 4 ms and for the operating tables 10*a* to 10*d* to select at random from waiting times of 5, 6, 7 or 8 ms. Since not all the subscribers 10*a* to 10*d*, 12*a* to 12*d* wish to transmit simultaneously, collisions would occur only rarely and would then be corrected in the manner explained in more detail below. The random allocation of the waiting times means that the different operating tables 10*a* to 10*d* and their associated operator control devices 12*a* to 12*d* do not need to have the waiting times tuned to one another.

Each of the subscribers 10*a* to 10*d*, 12*a* to 12*d* uses its receiver 16 or 24 to receive its own signal and checks this signal. If it discovers that the signal has been disturbed by collision with another signal, for example, then it retransmits the associated data block the next time. This ensures that no data are lost despite occasional interference.

Although a preferred exemplary embodiment has been presented and described in detail in the drawings and in the preceding description, this should be considered purely exemplary and non-restrictive to the invention. It will be pointed out that the preferred exemplary embodiment has been shown and described and that all changes and modifications which are within the scope of protection of the invention at present and in future are intended to be protected.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A method for bidirectional IR data transfer between a medical treatment table and an operator control device which are subscribers in the IR data transfer and each comprise an IR transmitter and an IR receiver, wherein the data to be transferred by a subscriber are split into data blocks which are transmitted in succession, with a respective break being observed between the transmission of the individual data blocks, wherein data from another subscriber are transmitted within the breaks, wherein the transmission of a data block is preceded by a check to determine whether IR signals are present and is held until a predetermined waiting time has elapsed after the disappearance of the IR signal if IR signals are present, wherein the subscribers receive their transmitted signal themselves, check their transmitted signal, and retransmit the associated data if the signal has been disturbed, wherein the predetermined waiting time is selected at random, and wherein the predetermined waiting time for the operator control device is shorter than the predetermined waiting time for the medical treatment table.

2. The method according to claim 1, wherein a plurality of medical treatment tables and associated operator control devices having at least partly overlapping IR signal reception ranges are provided, and wherein each of the subscribers is allocated a different waiting time.

3. The method according to claim 1, in which the carrier frequency for the IR signals is more than 120 kHz.

4. The method according to claim 1, in which each data block contains an identification code which is associated with a subscriber, and in which each subscriber identifies from the identification code whether the data block is intended for it.

5. The method according to claim 1, in which the signal length of a data block is between 1 ms and 50 ms.

6. The method according to claim 1, in which the break between the transmission of two data blocks by the same subscriber is 5 to 50 times the signal length of a data block.

7. The method according to claim 1, in which the data to be transferred from the operator control device to the medical treatment table relate to adjustment commands for adjusting the bearing surface of the medical treatment table.

8. The method according to claim 1, in which the data to be transferred from the medical treatment table to the operator control device relate to one or more of the following states of the medical treatment table: the current attitude and position of the bearing surface, the arrival at stored attitudes and positions of the bearing surface, error messages, information about functions which are not possible, connection to the power supply, the charge state of storage batteries, and a warning about a collision between the medical treatment table and accessories.

9. The method according to claim 1, in which the operator control device is formed by a portable, hand-held remote control, by a footswitch or by a wall-mounted remote control.

10. The method according to claim 9, in which the operator control device has a display.

11. A device for bidirectional IR data transfer between a medical treatment table and an operator control device, having a first IR data transfer unit which is arranged in the treatment table and which comprises an IR transmitter and an IR receiver, and having a second IR data transfer unit which is arranged in the operator control device and which comprises an IR transmitter and an IR receiver, in which the first and/or the second IR data transfer unit is programmed such that it splits data which are to be transferred into data blocks and transmits them in succession to the second or first data transfer unit, wherein it observes a respective break between the transmission of the individual data blocks and where the second or first data transfer unit is programmed to transmit data to the first or second data transfer unit within the breaks, wherein the first and/or the second IR data transfer unit is programmed such that it checks whether IR signals are currently present, and if IR signals are present, then it holds transmission of the data block until a predetermined waiting time has elapsed until the disappearance of the IR signal, wherein the first and/or the second IR data transfer unit is programmed such that it receives its transmitted IR signal itself, checks it and, if the signal has been disturbed, retransmits the associated data, wherein the predetermined waiting time is selected at random, and wherein the predetermined waiting time for the operator control device is shorter than the predetermined waiting time for the medical treatment table.

12. The device according to claim 11, which is suitable for carrying out a method.

* * * * *